(12) United States Patent
Nevoigt et al.

(10) Patent No.: US 7,311,182 B2
(45) Date of Patent: Dec. 25, 2007

(54) SEALING AND GUIDING PACKET

(75) Inventors: Andreas Nevoigt, Hagen (DE); Steffen Lang, Ennepetal (DE)

(73) Assignee: Thyssenkrupp Bilstein GmbH, Ennepetal (DE)

( * ) Notice: Subject to any disclaimer, the term of this patent is extended or adjusted under 35 U.S.C. 154(b) by 262 days.

(21) Appl. No.: 11/174,332

(22) Filed: Jul. 2, 2005

(65) Prior Publication Data

US 2006/0006031 A1    Jan. 12, 2006

(30) Foreign Application Priority Data

Jul. 9, 2004   (DE) .................... 10 2004 033 214

(51) Int. Cl.
  *F16F 9/36*    (2006.01)
  *F16J 15/56*   (2006.01)
(52) U.S. Cl. .............. 188/322.17; 277/467; 277/468; 277/484; 277/522; 277/589
(58) Field of Classification Search ........... 188/322.17, 188/322.16; 277/503, 504, 512, 514, 578, 277/579, 582, 589, 540, 345, 467, 468, 470, 277/484, 522, 580, 556, 534, 535, 564, 558, 277/553, 559, 555, 561, 562, 563, 583, 581, 277/545
See application file for complete search history.

(56) References Cited

U.S. PATENT DOCUMENTS 2,368,380 A * 1/1945 Ruzicka ..................... 277/538
2,483,827 A * 10/1949 Guiler ........................ 277/589
2,974,983 A * 3/1961 Meyer ........................ 277/589
6,098,986 A * 8/2000 Nowak ....................... 277/522

FOREIGN PATENT DOCUMENTS

JP      2003269518 A  *  9/2003

* cited by examiner

*Primary Examiner*—Thomas Williams
(74) *Attorney, Agent, or Firm*—Max Fogiel

(57) ABSTRACT

To make a sealing and guiding packet available to shock dampers in order to minimize or even entirely prevent the negative effects of the so-called stick-slip effect and thus permit greater riding comfort, a sealing and guiding packet is proposed which comprises the following features:
a) A cylindrical gasket (6) surrounding an oscillating piston rod (10) and in contact with the latter, which has a first and a second end face (6a, 6b) and a cylindrical mantle surface (6c),
b) a cylindrical elastomer element (7) surrounding the ring (6), which has two radially extending flanges (7a, 7b), which thrust the ring (6) resiliently against the end faces, and which [elastomer element] has a radially extending third flange (7c) which biases the ring against the piston rod surface; as well as
c) tightening elements (1; 1.1, 1.2, 1.3; 4) which in the working state keep the elastomer element (7) under bias both in the axial and in the radial direction.

6 Claims, 3 Drawing Sheets

SEALING AND GUIDING PACKET

BACKGROUND OF THE INVENTION

The invention relates to a sealing and guiding packet for shock dampers. By means of such sealing and guiding packets, hydraulic shock dampers are sealed up on the one hand, and on the other hand these sealing and guiding packets serve to guide the piston rod in its oscillating movement. To achieve the sealing of the upper working space of the shock damper from the atmosphere, the sealing and guiding packet sealingly engages the interior wall of the shock damper tube on the one hand, while on the other hand it comprises a gasket which sealingly engages the surface of the piston rod which is in oscillating movement.

In the state of the art, numerous designs of such sealing and guiding packet are known. Thus, a sealing and guiding element is disclosed in DE 199 38 084, which has a guiding sleeve that is displaceable over a portion of the stroking movement of the piston rod and is joined to a spring element thrusting against a housing or an abutment body. The sealing element coming in contact with the piston rod is disposed for movement in common with the guiding sleeve. In this way, friction influences which act between the sealing element and the piston rod and lead to impairments of riding comfort are avoided. The friction between the sealing element and the piston rod can consequently lead to impairments of driving comfort, because, for example, the desired yielding motion of the vehicle's wheel, especially in small, shock-like stresses, due to sticking of the guiding sleeve or damping element on the piston rod is prevented or delayed (the so-called "stick-slip effect." A prevented or delayed inward springing movement of the vehicle wheel results in the introduction of especially undamped and/or unsprung disturbing forces into the vehicle's frame. To avoid this so-called "stick-slip effect" and thus achieve an improvement of riding comfort, it is proposed in DE 199 38 084 A1 to make both the sealing element and the guiding sleeve movable. This solution is comparatively expensive because important components of the entire sealing and guiding packet have to be made able to move. It is furthermore disadvantageous that the movement of the guiding sleeve inevitably involves wear due to movement.

The invention is addressed to the problem of making available a scaling and guiding packet for shock absorbers, which minimizes or entirely avoids the negative effects of the stick-slip effect, so that traveling comfort is improved.

In the inventive sealing and guiding packet, an elastomer element envelops the cylindrical ring which is in sealing contact with the piston rod. The elastomer element is shaped in an especially advantageous manner, so that the packet is optimally supported resiliently in the axial direction. The radially extending flanges of the elastomer element, which support the ring on their end faces, provide this optimal resilient support. At the same time, the elastomer element has an additional, shorter flange which acts on the circumferential surface of the cylindrical ring and biases the ring against the piston rod. By this bias it is assured that a ring will always sealingly engage the surface of the piston rod.

The resilient support of the ring has the consequence that, in the case of small movements of the piston rod in which the ring still adheres to the piston rod, the elastomer element moves on account of its resilient properties. Thus no peak forces occur any longer due to the so-called stick-slip effect. If the movements of the piston rod become greater, the elastomer element can no longer yield and the ring separates from the piston rod. In this manner, the effects developed by the stick-slip effect, which are disadvantageous to riding comfort, are effectively minimized or, in the ideal case, entirely avoided.

To protect the ring against tipping and jamming and hold it in position, it is advantageous if protective disks are disposed between the end faces of the ring and the lips of the elastomer element supporting them. These supporting disks can consist, for example, of a steel material.

The biasing elements can be made in different ways pursuant to the invention. In a first embodiment of the invention, the sealing and guiding packet includes a substantially cylindrical base body which has a recess into which the elastomer element can be inserted. The recess in the base body of such dimensions in proportion to the radial position of the piston rod that when the elastomer element is inserted into the base body or when the sealing and guiding packet is inserted into the shock damper, the elastomer element becomes compressed in the radial direction, so that a radial bias of the ring against the piston rod is the result. The axial bias of the elastomer element is achieved by a cover which is mounted on the base body with axial compression of the elastomer element. The elastomer element is thus compressed in the axial direction, so that a bias of the elastomer element acts axially against the seal.

In a second embodiment of the invention, pressure channels are present in which a fluid under pressure is situated. Through these pressure channels a pressure is directed against the face of the elastomer element turned away from the shock absorber's interior, which counteracts the pressure from the working chamber of the shock absorber. In this way the elastomer element is relieved of pressure. The fluid that is under pressure, which for example can be the pressurized damping fluid of the shock damper, acts either directly on the elastomer element, or the effect of the pressure on the elastomer element is transferred indirectly to the elastomer element, by the interposition of one or more additional supporting elements. The internal pressure of the shock absorber, which otherwise would force the elastomer element together with the ring upwardly is thereby compensated. In the ideal case, a complete relief of pressure on the elastomer element is achieved through the pressure passages, so that the elastomer element rests in the sealing and guiding packet without having to absorb an axial pressure load. The axial and radial bias of the elastomer element is achieved in the second embodiment in the same way as in the first embodiment.

In the third embodiment of the invention the biasing of the elastomer element, again like the first embodiment of the invention, is achieved [through] a pressure passage, i.e., the radial and axial biasing of the elastomer element is brought about in this third embodiment of the invention in a way similar to the above-described first embodiment of the invention. Unlike the second embodiment, in the third embodiment of the invention a pressure passage is disposed only above the elastomer element (i.e., on the side facing away from the shock damper's interior), and it is connected with a gas chamber that is under pressure, so that a gas that is under pressure is active in the pressure passage. This gas under pressure can act directly or indirectly on the elastomer element. Thus the internal pressure of the damper, by which the ring or the elastomer element is thrust upwardly, is counteracted, so that the damper pressure is equalized and the elastomer element is relieved of pressure.

The third embodiment of the invention can be used to special advantage whenever the shock damper is a component of an air strut. In this case the pressure chamber of the air strut can be used for the purpose of preparing the gas under pressure for the relief of pressure.

BRIEF DESCRIPTION OF THE DRAWINGS

In what follows, the invention is explained further with the aid of a drawing. In particular.

DETAILED DESCRIPTION OF THE INVENTION

Figure 1:
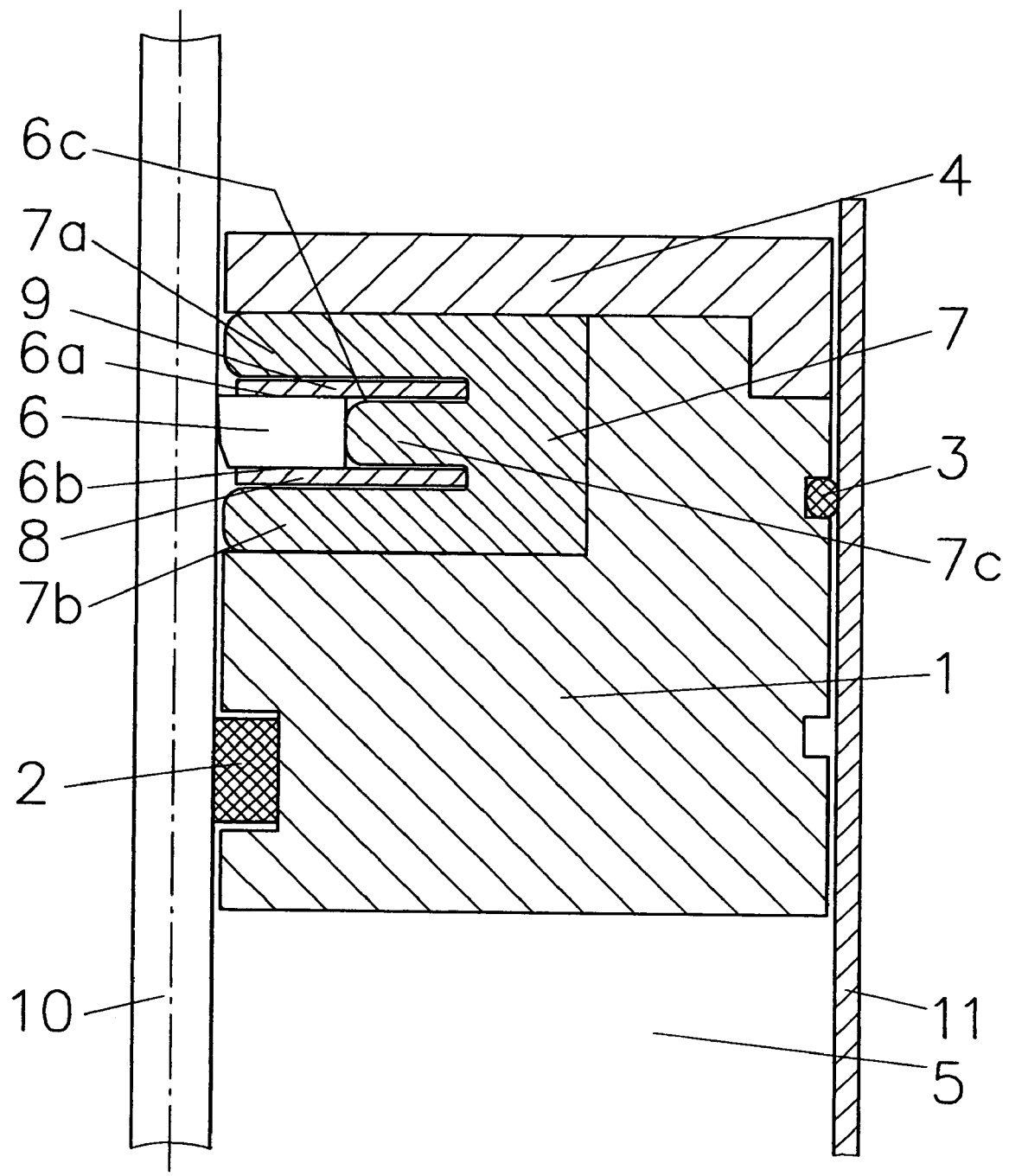
FIG. 1: shows an axial section through a sealing and guiding packet in a first embodiment of the invention.

In FIG. 1, an inventive sealing and guiding packet is shown in an axial half section. The sealing and guiding packet comprises a base body 1 which has at its upper end, near the piston rod, a recess into which an elastomer element 7 is inserted. This elastomer element 7 comprises a ring 6 which is in contact with the surface of the piston rod 10. The elastomer element 7 has radially extending flanges 7a, 7b, which overlap the faces 6a, 6b, of the ring 6, so that the ring 6 is thrust resiliently in the axial direction. Between the ring 6 and the flanges 7a and 7b of the elastomer element 7, supporting rings 8, 9, are disposed, so that the flanges 7a, 7b, of the elastomer element 7 are not directly in contact with the ring but the resilient support of the ring is provided indirectly with the interposition of supporting rings 8 and 9. The supporting rings 8, 9, are necessary in the invention but not indispensable. If the shape and design of the elastomer element, e.g., in regard to shape and/or irregular thickness distribution, they can be omitted.

Between the flanges 7a, 7b, of the elastomer element 7 an additional flange 7c extending radially is formed, which is biased radially against the circumferential surface 6a of the cylindrical ring 6. After the insertion of the elastomer element 7 into the recess in the base body 1, the elastomer element 7 extends to a certain extent beyond the upper edge of the base body 1. The portion of elastomer element 7 reaching beyond the base body 1 is compressed axially by the cover 4 when the cover 4 is mounted on the base body 1. Thus, an axial compression of the elastomer element 7 occurs, so that an axial bias is obtained. By this axial bias the ring 6 is resiliently supported axially by the flanges 7a and 7b and held fixed.

The flange 7c is dimensioned in its radial width such that it exerts a force against the mantle surface of the cylindrical ring 6 so that the latter is held in the inserted state under radial bias. In this manner the elastomer element 7 is biased both in the axial and in the radial direction.

The resilient mounting, described above, of the ring 6 brings the result that, in small movements of the piston rod, in which the ring still is in contact with the piston rod, the elastomer moves, because it is compressed. Due to this compression of the elastomer, small and shock-like compressions of the elastomer are cushioned. No peak forces are produced by the so-called stick-slip effect. But if the movements of the piston rod become greater, the elastomer element can no longer yield and the gasket comes away from the piston rod, but this does not happen abruptly. In this manner, abrupt peak forces, produced by a pronounced stick-slip effect, are effectively avoided.

By means of the supporting rings 8, 9, the ring is protected against tipping and upending, and held in its intended position. The design of the elastomer element 7 with the two outer, narrower flanges 7a, 7b, thus promotes the stability of the ring. The shorter flange 7 urges the ring 6 against the piston rod 10 and, if the possibility of the application of pressure is created by design, places the two O-rings outside of the so-called "step-seal" gaskets known in the state of the art (cf. Patent DE 198 36 286). The element 7c operates like the O-rings shown in the aforesaid patent since, when pressure is applied, a resilient deformation increases the urging of the ring 6 against the piston rod 10 according to the pressure. This is brought about by the appropriate shape and the elastic properties and incompressibility of the element 7c.

Figure 2:
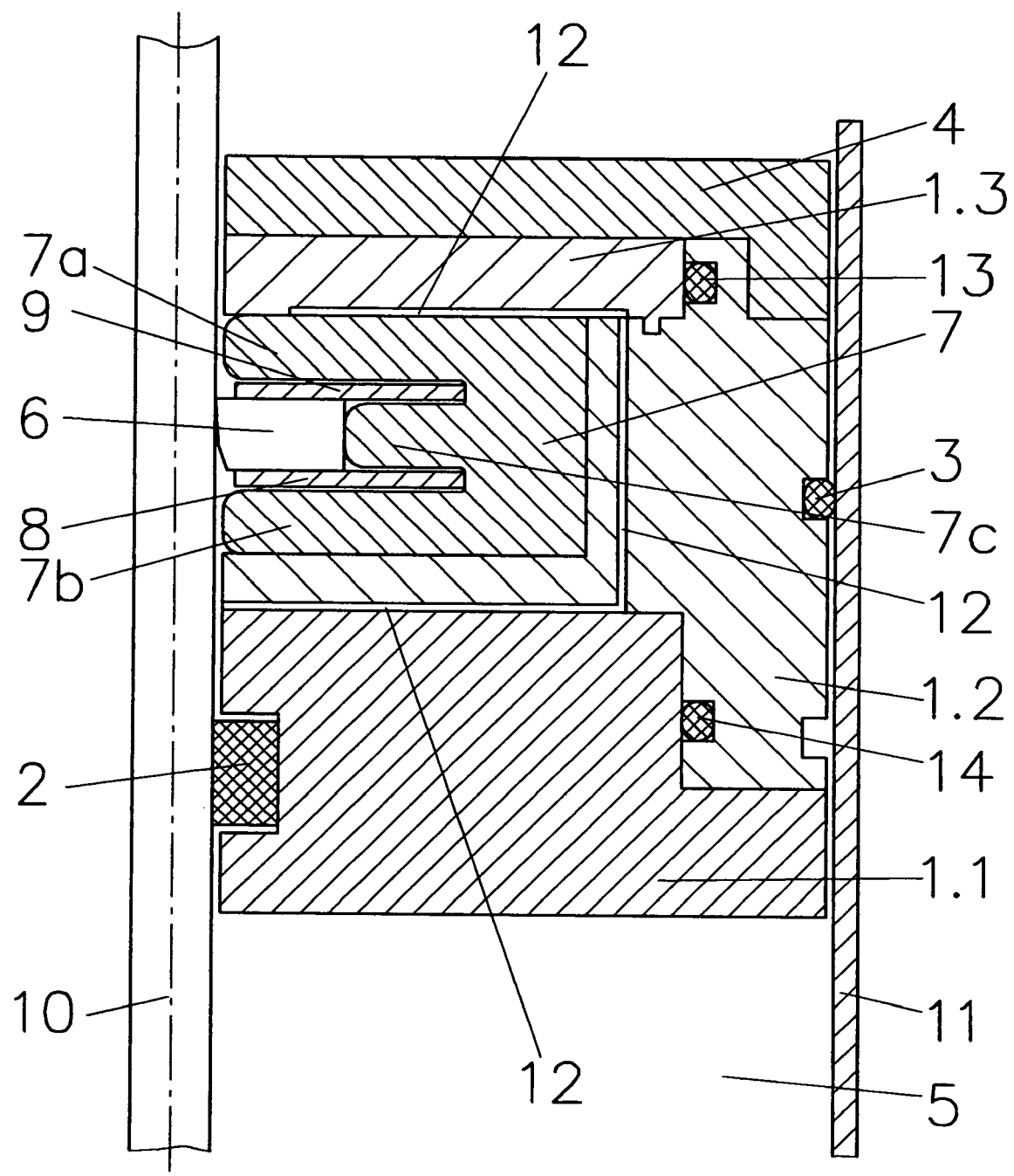
FIG. 2 an axial section through a sealing and guiding packet according to a second inventive embodiment, and FIG. 3 an axial section through a sealing and guiding packet in a third inventive embodiment.

In FIG. 2 the base body of the sealing and guiding packet is shown sectionalized. Components 1.1, 1.2 and 1.3 form the base bodies of the sealing and guiding packet. The individual components of the multipartite base body are sealed against one another by the o-ring seals 13 and 14. The ring between the base body and shock damper tube 11 is provided by the o-ring 3. In the base body component 1.1 a slot is created in which a guiding band 2 is disposed for centering the piston rod which is in contact with the piston rod 10. This guiding band 2 is usually made in a known manner from the material PTFE, the PTFE being able to contain different fillers. Furthermore, the guiding band 2 serves to take up transverse forces acting on the piston rod.

In the base body components 1.1 and 1.2 pressure passages 12 are formed, by which the damping fluid is carried, which is under pressure in the working state. This pressurized damping fluid exerts a pressure on the elastomer element 7 from above, which results in an axial biasing of the elastomer element and balances out the internal pressure of the damper. Thus pressure is not applied to the ring 6 unilaterally and thus it runs under balanced pressure. Thus, the surfaces under pressure are matched and designed accordingly. The movement of the elastomer is assured in both directions. The upper horizontal pressure passage 12 is in this embodiment of the invention formed between the component 1.3 of the base body and the elastomer element 7.

A balancing of pressure above the elastomer element is achieved by the pressure passages 12. A better responsiveness is thereby assured. The o-ring 14 seals the base body components 1.1 and 1.2 from the exterior.

Figure 3:
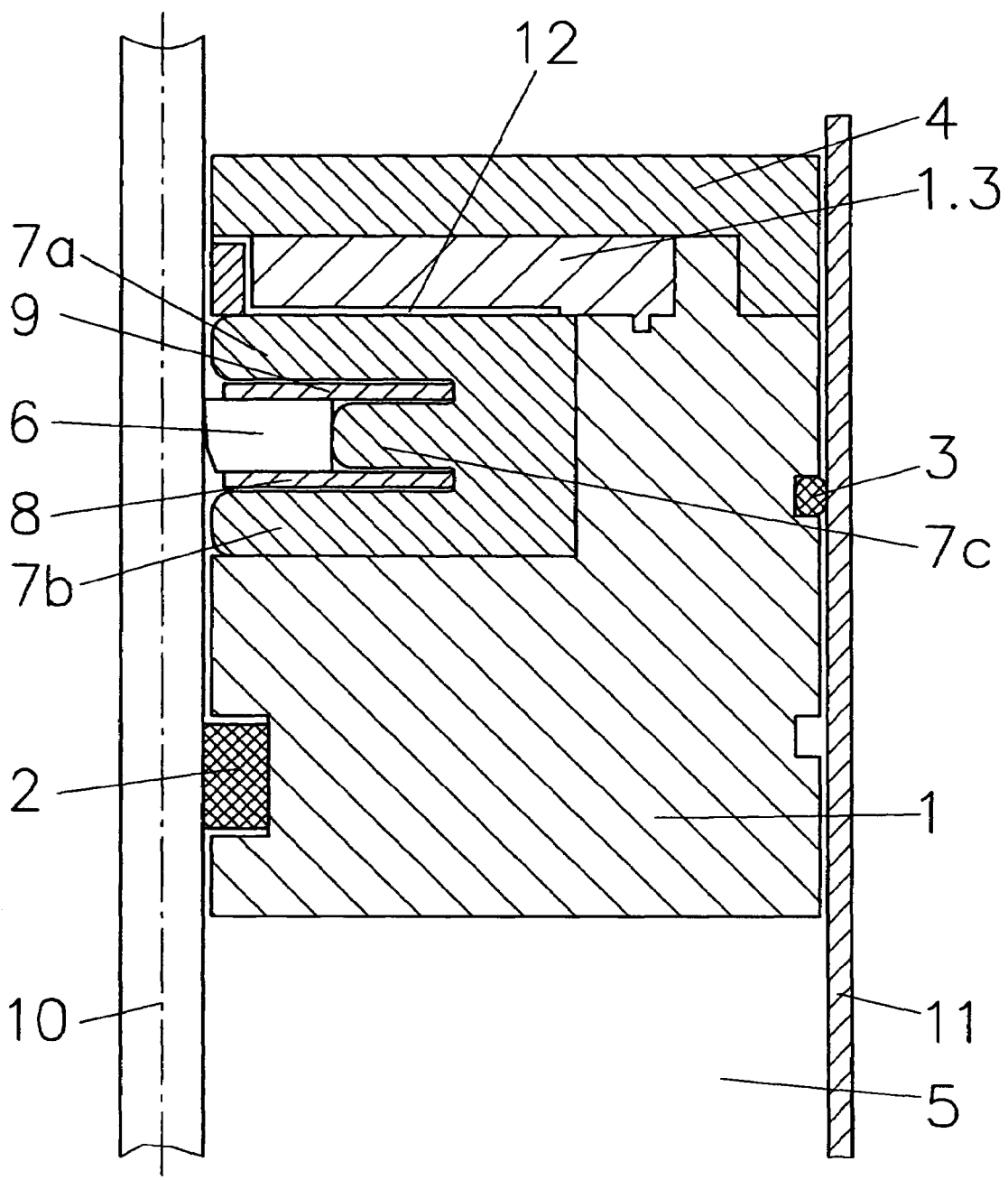

A third embodiment of the invention is represented in FIG. 3. In this embodiment of the invention the base body 1 of the sealing and guiding packet is made substantially the same as in the first embodiment explained at FIG. 1. The radial bias of the elastomer element 7 is thus brought about in the same way as explained above at FIG. 1. In the upper part of the sealing and guiding packet, a pressure passage 12 is provided in this third embodiment of the invention and belongs between a component 1.3 belonging to the base body 1, and the elastomer element 7. This pressure passage is in communication with a gas pressure chamber, which can be, for example, the pressure chamber of an air spring. The gas under pressure in this gas pressure chamber is thus also fed to the pressure passage 12 and acts directly in the axial direction on the elastomer element 7. The high external pressure provides for an equalization of the pressure that acts from below, i.e., from the working chamber, on the elastomer element. Thus the ring can be operated under equal pressure and its movement in both axial directions is assured.

This design of the sealing and guiding packet has the advantage that the pressure chamber present in an air strut can be used in a simple design for the purpose of accomplishing the pressure equalization of the elastomer element 7.

The invention claimed is:

1. A sealing and guiding packet for shock dampers, comprising: a ring encompassing a piston rod driven to oscillate, said ring being in contact with said piston rod; said ring having a first end face and a second end face; said ring having also a cylindrical mantle surface; a cylindrical elastomer element surrounding said ring and having two radially projecting flanges thrusting said ring resiliently against said end faces; said elastomer element having a radially extending flange biasing said ring against said piston rod; biasing elements on said elastomer element and holding said elastomer element under bias in both axial and radial directions when in a working state; pressure passages for applying pressure to said elastomer element and carrying fluid under pressure when in the working state, said fluid acting directly or indirectly on said elastomer element and producing pressure relief of said elastomer element against internal pressure of a shock damper.

2. A sealing and guiding packet as defined in claim 1, including supporting disks between said end faces and said flanges.

3. A sealing and guiding packet for shock dampers as defined in claim 1, including a substantially cylindrical base body forming said biasing elements and a cover, said base body having a recess far inserting said elastomer element thereinto with radial compression for producing a radial bias, said cover being joined with said base body for placing said elastomer element under bias in an axial direction in the working state.

4. A sealing and guiding packet for shock dampers as defined in claim 1, wherein said pressure passages are hydraulic passages carrying pressurized damping fluid of the shock damper.

5. A sealing and guiding packet for shock dampers as defined in claim 1, wherein said pressure passages are gas pressure passages; and an air spring having a gas pressure providing for pressure equalization.

6. A sealing and guiding packet for shock dampers, comprising: a ring encompassing a piston rod driven to oscillate, said ring being in contact with said piston rod; said ring having a first end face and a second end face; said ring having also a cylindrical mantle surface; a cylindrical elastomer element surrounding said ring and having two radially projecting flanges thrusting said ring resiliently against said end faces; said elastomer element having a radially extending flange biasing said ring against said piston rod; biasing elements on said elastomer element and holding said elastomer element under bias in both axial and radial directions when in a working state; pressure passages for applying pressure to said elastomer element and carrying fluid under pressure when in the working state, said fluid acting directly or indirectly on said elastomer element and producing pressure relief of said elastomer element against internal pressure of a shock damper; supporting disks between said end faces and said flanges; a substantially cylindrical base body forming said biasing elements and a cover, said base body having a recess for inserting said elastomer element thereinto with radial compression for producing a radial bias, said cover being joined with said base body for placing said elastomer element under bias in an axial direction in the working state; said pressure passages being hydraulic passages carrying pressurized damping fluid of the shock damper.

\* \* \* \* \*